United States Patent [19]

Apissomian

[11] Patent Number: 4,503,780

[45] Date of Patent: Mar. 12, 1985

[54] TABLE WITH RESILIENT EDGE

[75] Inventor: Arthur A. Apissomian, Wadena, Minn.

[73] Assignee: Homecrest Industries Incorporated, Wadena, Minn.

[21] Appl. No.: 429,972

[22] Filed: Sep. 30, 1982

[51] Int. Cl.³ .............................................. A47B 17/00
[52] U.S. Cl. ......................................... 108/27; 52/813; 108/159; 248/345.1; 312/140
[58] Field of Search ..................... 108/27, 159, 161; 29/447, 448, 449; 52/822, 823, 829, 813; 248/345.1; 24/543, 563; 312/140, 14.4

[56] References Cited

U.S. PATENT DOCUMENTS

| | | | |
|---|---|---|---|
| 2,118,213 | 5/1938 | Malott | 312/140 X |
| 2,353,777 | 7/1944 | Weissert | 52/813 |
| 2,662,620 | 12/1953 | Vojta | 52/813 |
| 2,728,957 | 1/1956 | Keller | 312/140.4 |
| 2,729,142 | 1/1956 | Beach et al. | 52/823 |
| 4,107,897 | 8/1978 | Ullman, Jr. | 52/823 |

Primary Examiner—James T. McCall
Attorney, Agent, or Firm—Kinney & Lange

[57] ABSTRACT

A furniture construction such as a table is made using a method for attaching a closed loop stretchable edging to a rigid rim of the table. The method includes stretching the edging with an apparatus having a plurality of dog plates that extend outwardly from a common axis to a size greater than the perimeter of the rim. The rim of the table is then positioned within the interior of the stretched closed loop edging. The dog plates are then retracted, permitting the edging to retract and elastically engage the rim. The edging preferably includes a flexible upper lip that is pulled back to permit a table top panel to be positioned under the lip. When the lip is allowed to retract, the lip engages the edge portion of the table top panel, securing the table top panel to the rim of the table.

6 Claims, 5 Drawing Figures 4,503,780

TABLE WITH RESILIENT EDGE

BACKGROUND OF THE INVENTION

1. Field of the Invention

The present invention relates to the construction of furniture, and in particular, it relates to the securing of an edging to the rim of a table.

2. Description of the Prior Art

The use of edging for furniture pieces is quite commonplace, especially if the top of the furniture piece is made from a composite material or a layered laminate panel material. The edging serves several purposes. First, the edging hides the sides of the panel material providing an esthetically pleasing edge to the panel and the furniture piece. Second, the edging protects the sides of the panel from getting marred or chipped through normal use. Third, the edging serves as a device to hold the panel together so that the panel does not separate due to humidity and moisture or age. Fourth, the edging can also serve to secure the panel to a rim structure of the furniture piece.

Prior to the present invention, most furniture edging was made of a rigid material. There are several patents that show a metal strip, such as aluminum, used to edge the top panel of furniture pieces.

The Bonnell U.S. Pat. No. 2,549,414, the Torrence U.S. Pat. No. 2,705,820, the Pasewalk U.S. Pat. No. 2,846,283, The Braal et al U.S. Pat. No. 2,851,323, and the Irwin et al U.S. Pat. No. 2,957,737 show various configurations of metal edgings for table tops and desks. The Irwing et al and the Braal et al patents illustrate desks having metal edges that are secured to the sides of the desk by bending one or more flanges, crimping the edging to an edge portion of a top desk panel. The Torrence and the Bonnell patents show edging that is held to the sides of the table top panel by forcing an arrow-shaped flange of the edging into a slot in the table top panel. The Pasewalk Patent illustrates an edge trim for a desk that holds a linoleum top to the top of the desk while hiding from view the sides of the linoleum and the rim of the desk.

The Fisher U.S. Pat. No. 1,967,666 discloses a round rim of metal which is welded together to form a loop that is used as an edging for a round table panel. The round metal rim is held in place by bending an appropriate lower flange against the bottom of a table rim.

The Raggio U.S. Pat. No. 2,297,072 shows an edge which may be formed of a composition material, rubber, cork, Bakelight, pyralin, or a thermoplastic material. The edge is held in place by a metal strip which is tightened around the edging with the metal strip being welded or crimped together.

All of the above-mentioned patents show edgings which are either crimped around a panel or are fastened to the panel by suitable mechanical fasteners. Such edgings must be bent or formed to the contour of the panel member since they will not freely conform to it. Such bending requires either extra tooling or effort or both. In addition, if a translucent panel is used, such as glass or plastic, the use of mechanical fasteners or the crimping of flanges to secure the edging to the table rim and translucent panel will show through the translucent panel.

The Feldman U.S. Pat. No. 2,636,189 shows a teething rail made of a plastic molding that is secured to a rail, apparently made from wood. The molding includes two outer arms and an intermediate arm all extending from a back portion. The two outer arms engage the sides of the wood and the intermediate arm extends into a slot in the wood. Although the edging of the Feldman Patent is quite suitable for a teething rail, the edging would not be satisfactory when placed horizontally in a furniture piece, especially a furniture piece having a translucent panel member whose sides not only need to be protected, but which need to be secured to the remaining structure of the table.

SUMMARY OF THE INVENTION

The present invention includes a furniture construction such as a table and a method of attaching a closed loop stretchable edging to a rigid rim of the furniture construction. The method includes positioning a stretchable edging in an attaching plane which is defined by the rim. The stretchable edging is then stretched beyond the perimeter of the rim of the table. The rim is positioned within the interior surface of the stretchable edging and the stretchable edging is then permitted to relax around the rigid rim such that the edging elastically engages the rim.

The edging preferably has an upper lip defining a cavity wherein a panel, such as a glass panel, is held and thereby secured to the rim of the table top. The lip is made of a flexible plastic material and is drawn back allowing an edge portion of the panel to be inserted under the lip with the lip retaining the panel on the rim of the table.

DETAILED DESCRIPTION OF THE PREFERRED EMBODIMENT

Figure 1:
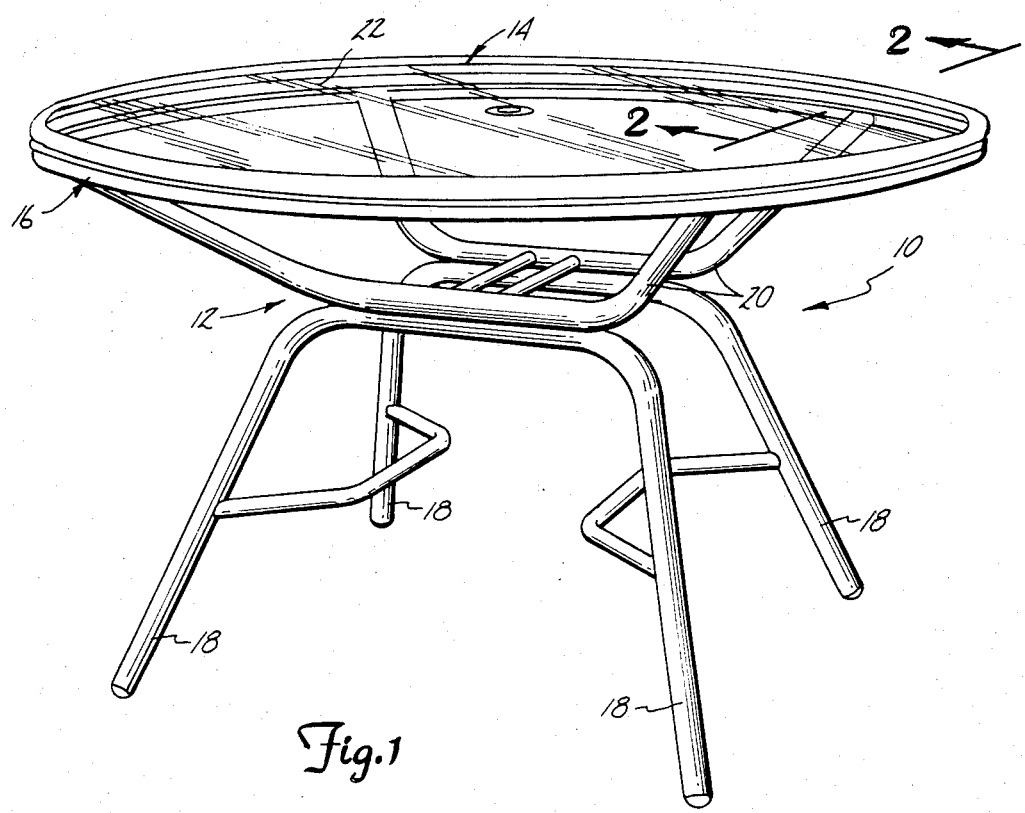
FIG. 1 is a perspective view of the table of the present invention.

A table generally indicated at 10 includes a support structure 12, a table top 14 and a continuous loop of stretchable edging 16 securing the top 14 to the support structure 12. The support structure 12 preferably includes a plurality of ground-engaging legs 18 and a pair of U-shaped rigid members 20 with upwardly extending legs and secured at a lower portion to the tops of the legs 18, such as by welding. The legs 18 are shown as the downwardly extending legs of two U-shaped tubular members, the upper portions of such U-shaped members being welded to the lower portion of member 20. A table rim 22 is permanently attached to the top ends of the U-shaped rigid supports 20.

The edging 16 is preferably an internally extruded edging made of a soft resilient expandable flexible plastic such as a polyvinyl chloride polymer commonly referred to merely as vinyl. The edging is a continuous closed loop, the continuous loop being formed by either heat welding or solvent welding the ends of the edging together to form the loop.

The edging 16 of the present invention elastically engages the table top rim 22 and secures the table top 14 which may be of glass to the rim.

Figure 2:
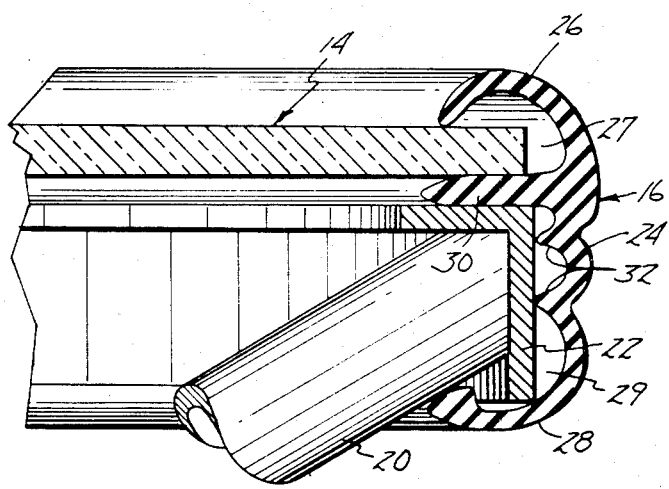
FIG. 2 is an enlarged fragmentary cross sectional view of the edging of the present invention taken along the line 2—2 in FIG. 1.

The edging 16, as best shown in FIG. 2, includes a primary back portion 24, a curved upper lip 26, a curved lower lip 28 and a resilient intermediate flange 30 spaced between the curved upper lip 26 and the curved lower lip 28. The upper lip 26, the lower lip 28 and the intermediate flange 30 extend inwardly from an inner surface of the primary back portion 24.

The upper lip 26 and the intermediate flange 30 form a first cavity 27 for receiving an edge portion of the table top 14. Similarly, the intermediate flange 30 and the lower lip 28 form a second lower cavity 29 for receiving the rim 22. The intermediate flange 30 serves to separate the top 14 from the rim 22 providing a cushion between the top and rim. A cushion is important if the top 14 is made of a material such as glass, which requires protection from a metal rim during transportation and normal use.

The edging 16 also preferably includes one or more projections 32 shorter than the intermediate flange and projecting inwardly less than the lower lip 28. The projection 32 abuts against an outside surface of the rim 22 providing support for the primary back portion 24 when the edging is installed around the rim. The projections 32 further add to the resiliency of the edging.

Figure 3:
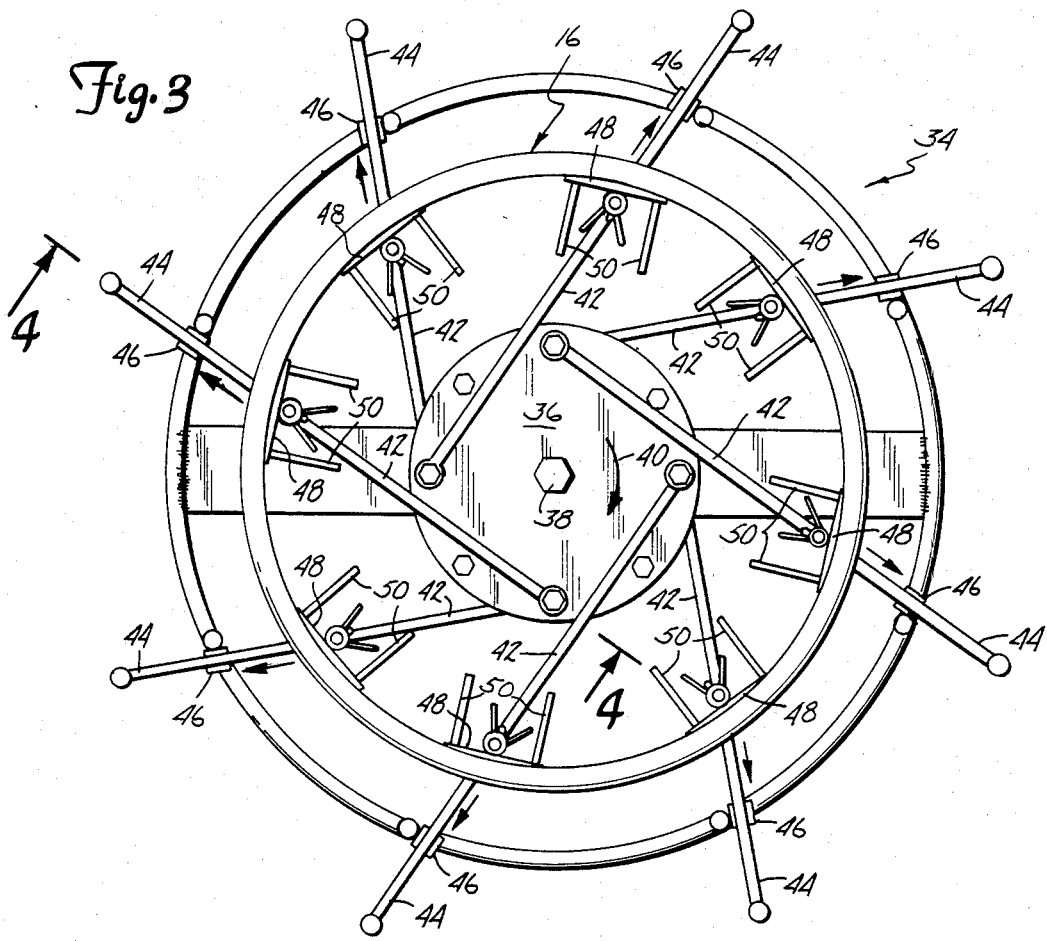
FIG. 3 is a top plan view of the apparatus used to stretch the edging of the present invention.

To attach the edging of the present invention to the structure 12, the closed loop of edging is positioned within a preferred stretching apparatus 34 as illustrated in FIG. 3. The stretching apparatus includes a central disc rotatable about a central axis 38 in the direction of arrow 40. A plurality of rigid arm members 42 are pivotally mounted on the disc 36 in pairs away from the central axis 38. Each pair of rigid arm members is pivoted about a single axis with one of the arm members of each pair being mounted below the disc 36 and one arm member mounted above the disc 36. The rigid arm members extend outwardly from the rotatable disc with each arm member 42 having a distal end 44 positioned within a guide 46 that is supported by the frame of the stretching apparatus 34.

Figure 5:
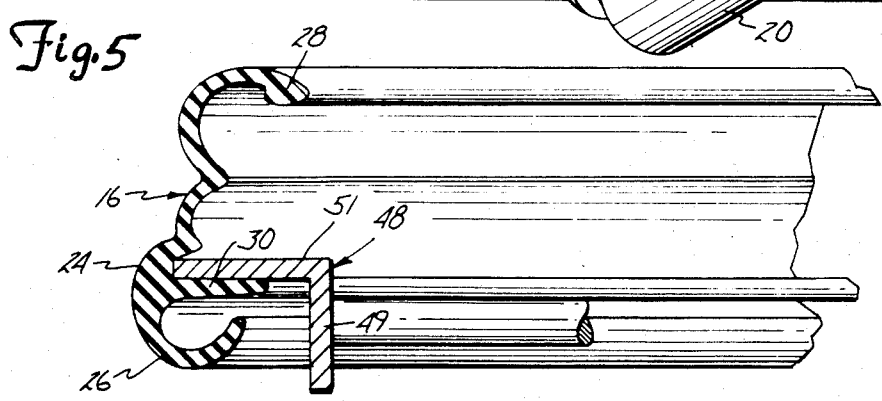
FIG. 5 is an enlarged fragmentary cross sectional view of the edging of the present invention engaged by a dog plate.
Figure 4:
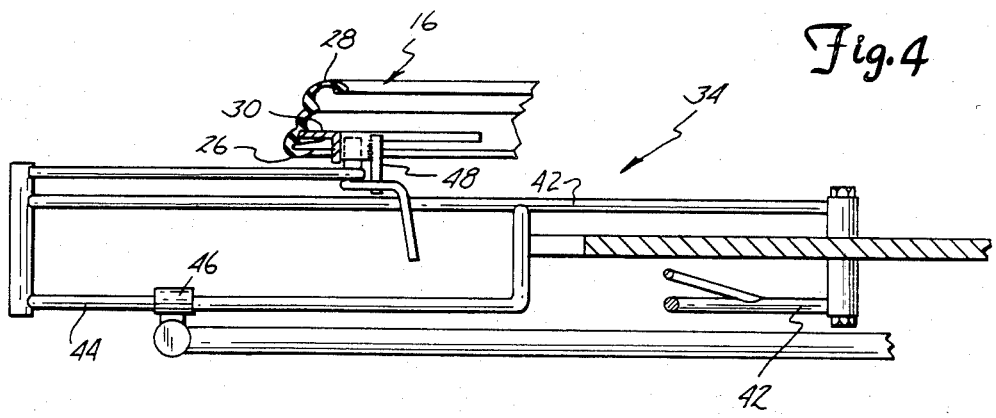
FIG. 4 is an enlarged fragmentary cross sectional view of an arm and dog plate of the present invention taken the line 4—4 in FIG. 3.

A dog plate 48 is pivotally mounted on each rigid arm member 42, each dog plate is angular in cross section having a vertical leg 49 pivotally secured to its associated arm member 42 and a horizontal leg 51. The horizontal leg 51 engages an inside surface of the edging 16 proximate the intermediate flange 30 on a side closest to the lower lip 28, as illustrated in FIGS. 4 and 5. Extending substantially horizontally from each dog plate inwardly toward the central axis 38 are a pair of support arms 50 for supporting the rim 16 of the table when the edging 16 is being attached to the rim.

To attach the closed loop stretchable edging to the rim of the table, the edging is heated to its stretching temperature and placed with the lower lip in the upper position and an upper lip 26 in a lower position, as illustrated in FIG. 5, and with the dog plate 48 engaging an inner surface of the edging above the intermediate flange 30. The disc 36 is rotated operating as a cam with the arms 42 pivoting about their axis and moving outwardly, guided by the guides 46. As the dog plates move outwardly the edging is stretched.

When the edging is stretched past the diameter of the rim of the table structure, the table structure is inverted and the rim is placed such that its upper surface rests on the support arms 50 of each dog plate 48 and in the same plane as the second cavity 29. The stretching device is then turned in an opposite direction of arrow 40 allowing the dog plates 48 to move towards the center of the device and permitting the edging to contract as it cools and elastically engage and receive the rim within cavity 29.

Although the preferred stretching apparatus has been described with particular detail, it should be understood that any type of stretching device that stretches the edging outwardly in the manner described is within the scope of the present invention.

After the edging has been attached to the rim, the dog plates are removed from engagement with the edging and the table structure. The table structure with the edging is taken off the stretching device and placed right side up. The top 14 is then secured to the rim by progressively bending back the upper curved lip 26 and placing an edge portion of the top 14 beneath the lip 26 within the first cavity 27.

Upon assembly of the structure of the present invention, the upper lip engages the top surface of the top 14 and the lower lip member extends below the lower end of the rim 22. The intermediate flange 30 is positioned between the top 14 and the rim 22 providing a resilient cushion between the rim 22 and the top 14.

CONCLUSION

The edging of the present invention not only conceals the metal rim and the edge of the top 14 from view, but provides a resilient edge that protects the top panel during both transportation and in use. This is quite important when the top 14 is made of glass. In addition, the edging provides a cushioning buffer between a glass top 14 and the metal rim 12 while holding the top 14 securely to the table rim. The flexibility of the edging permits the edging to conform easily to a round table top as shown in the figures or to any other top configuration with the appearance of having been molded into that configuration.

Although the present invention has been described with reference to a preferred embodiment, workers skilled in the art will recognize that changes may be made in form and detail without departing from the spirit and scope of the invention.

What is claimed is:

1. A furniture construction comprising:
   a floor engaging base;
   a rigid rim attached to the base;
   a panel member disposed above the rim;
   a flexible resilient continuous loop edging having an outer portion and an upper lip, a lower lip and an intermediate resilient flange projecting from the outer portion, the flange being spaced from and between the upper and lower lip with the lower lip and intermediate flange elastically engaging the rigid rim and the upper lip and intermediate flange elastically engaging a perimeter edge portion of the panel member placing the panel member in a spaced relationship from the rim and providing a cushion between the panel member and the rim and securing the panel member to the rim.

2. The construction of claim 1 wherein the edging is a continuous loop of flexible vinyl.

3. The construction of claim 1 and further including at least one projection projecting from the outer portion between the flange and the lower lip, the projection abutting against the rigid rim.

4. The construction of claim 1 wherein the panel member is made of glass.

5. The construction of claim 4 wherein the upper lip is curved downwardly to engage the glass.

6. The construction of claim 5 wherein the lower lip is curved upwardly to engage the rim.

* * * * *